(12) United States Patent
Gleason et al.

(10) Patent No.: US 9,321,317 B2
(45) Date of Patent: Apr. 26, 2016

(54) VEHICLE COMPONENT

(75) Inventors: John Gleason, South Lyon, MI (US); Dirk Adamczyk, Bermatingen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 14/110,204

(22) PCT Filed: Mar. 13, 2012

(86) PCT No.: PCT/EP2012/054355
§ 371 (c)(1),
(2), (4) Date: Oct. 7, 2013

(87) PCT Pub. No.: WO2012/139844
PCT Pub. Date: Oct. 18, 2012

(65) Prior Publication Data
US 2014/0232081 A1 Aug. 21, 2014

(30) Foreign Application Priority Data

Apr. 14, 2011 (DE) .......................... 10 2011 007 390

(51) Int. Cl.
*B60G 7/00* (2006.01)
*F16C 7/02* (2006.01)
(Continued)

(52) U.S. Cl.
CPC .............. *B60G 7/001* (2013.01); *B60G 17/019* (2013.01); *F16C 7/02* (2013.01); *F16C 7/06* (2013.01);
(Continued)

(58) Field of Classification Search
CPC .... B60G 7/001; B60G 7/00; B60G 2206/016; B60G 2206/10; B60G 2206/11; B60G 2206/7104; B60G 2206/7102; B60G 2206/71; B60G 2206/70; B60G 2206/72; F16C 7/02; F16C 7/00; Y10T 74/2142; Y10T 74/2144; Y10T 403/472
USPC .......................... 188/371; 74/579 R; 403/267
See application file for complete search history.

(56) References Cited

U.S. PATENT DOCUMENTS 5,104,136 A 4/1992 Buhl et al.
5,615,967 A 4/1997 Hellon
(Continued)

FOREIGN PATENT DOCUMENTS

DE 35 30 353 A1 3/1987
DE 39 15 991 A1 11/1990
(Continued)

OTHER PUBLICATIONS

English translation of the Written Opinion of the International Search Authority for application PCT/EP2012/054355.*
German Search Report Corresponding to 10 2011 007 390.6 mailed Nov. 25, 2011.
International Search Report Corresponding to PCT/EP2012/054355 mailed Jun. 13, 2012.

*Primary Examiner* — Keith Frisby
(74) *Attorney, Agent, or Firm* — Davis & Bujold PLLC; Michael J. Bujold

(57) ABSTRACT

A vehicle component with at least two connection points, a structural component that extends between the connection points and rigidly connects them with one another. The structural component comprises at least one insert made of a ductile material and at least two connection zones that support or form the two connection points, at least one of the zones comprises plastic. The structural component comprises at least one intermediate section that connects the two connection zones rigidly to one another and comprises the insert or is formed by the insert, this section is more ductile than at least one of the two connection zones and, in relation to a mechanical overload of the structural component, forms a locally delimited weak-point or region.

30 Claims, 4 Drawing Sheets

(51) Int. Cl.
*B60G 17/019* (2006.01)
*F16C 7/06* (2006.01)

(52) U.S. Cl.
CPC ... *B60G 2204/1162* (2013.01); *B60G 2206/016* (2013.01); *B60G 2206/10* (2013.01); *B60G 2206/71* (2013.01); *B60G 2206/72* (2013.01); *B60G 2400/60* (2013.01); *B60G 2400/64* (2013.01); *B60G 2600/04* (2013.01); *F16C 2202/00* (2013.01)

(56) References Cited

U.S. PATENT DOCUMENTS

| | | | |
|---|---|---|---|
| 6,298,962 B1 * | 10/2001 | Kato et al. | 188/371 |
| 6,749,360 B2 | 6/2004 | Abels | |
| 7,083,199 B2 | 8/2006 | Graber et al. | |
| 7,159,880 B2 | 1/2007 | Budde et al. | |
| 2004/0034958 A1 * | 2/2004 | Buchanan, Jr. | 15/250.31 |

FOREIGN PATENT DOCUMENTS

| | | |
|---|---|---|
| DE | 42 26 010 A1 | 2/1994 |
| DE | 195 42 496 C1 | 10/1996 |
| DE | 101 53 799 A1 | 5/2003 |
| DE | 101 53 970 A1 | 5/2003 |
| EP | 0 399 253 A1 | 11/1990 |
| EP | 0 690 242 A1 | 1/1996 |
| FR | 2 862 559 A1 | 5/2005 |
| JP | 2-249709 A | 10/1990 |
| JP | 7-89311 A | 4/1995 |
| JP | 10-35235 A | 2/1998 |
| JP | 10-109511 A | 4/1998 |
| JP | 11-28920 A | 2/1999 |
| WO | 01/44002 A1 | 6/2001 |

* cited by examiner

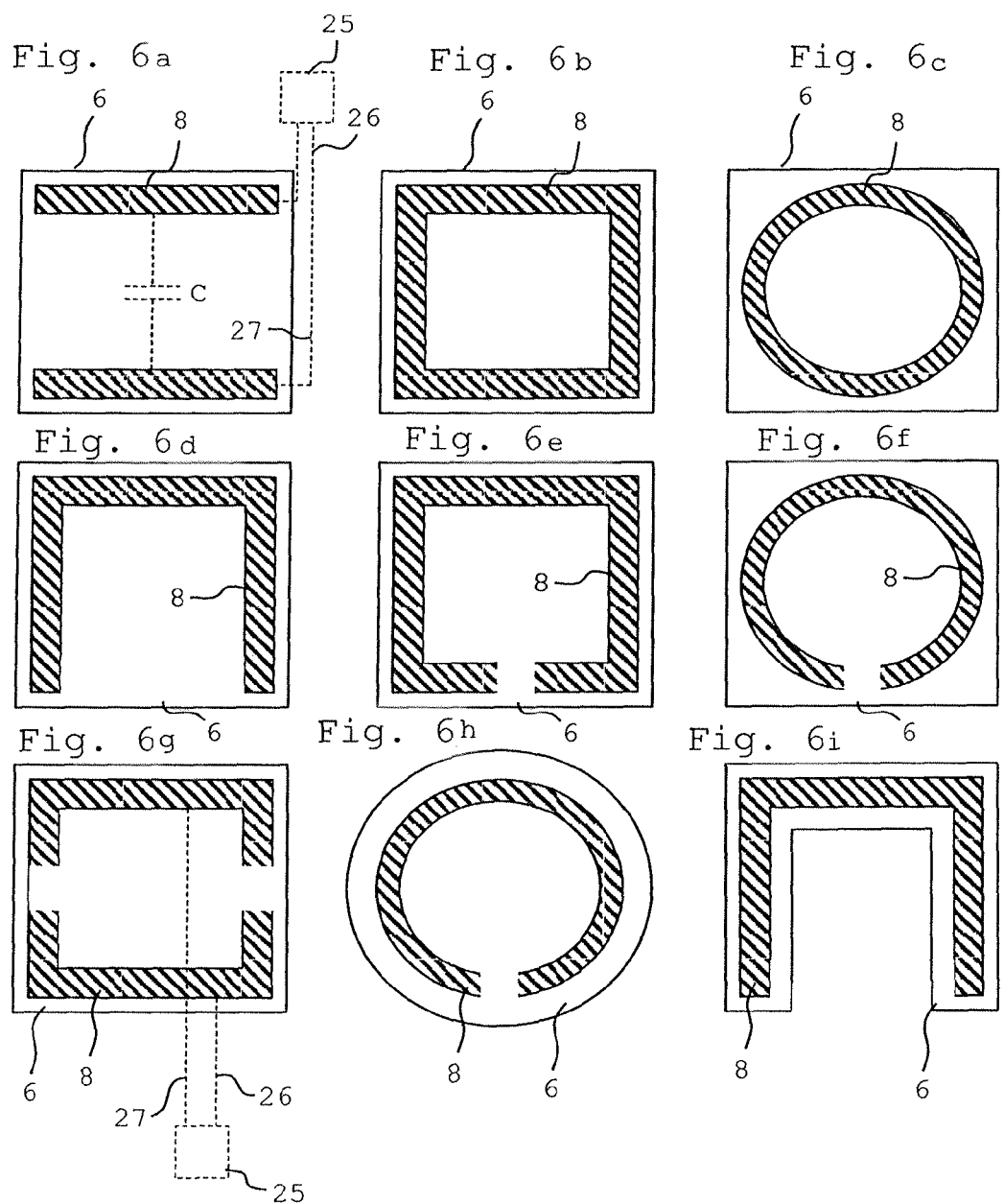

VEHICLE COMPONENT

This application is a National Stage completion of PCT/EP2012/054355 filed Mar. 13, 2012, which claims priority from German patent application serial no. 10 2011 007 390.6 filed Apr. 14, 2011.

FIELD OF THE INVENTION

The invention concerns a vehicle component having at least two connection points and a structural component that extends between the connection points and connects them rigidly to one another, which component comprises at least one insert made of a ductile material and at least two connection zones that support or form the connection points, at least one of the zones being made of plastic.

BACKGROUND OF THE INVENTION

DE 101 53 799 A1 discloses a positive-force connection strut of a chassis of a passenger vehicle or a utility vehicle for forming a connection between a chassis and a wheel carrier, which has an elongated basic body and at least two end-positioned bearing mountings for transmitting forces in and out, such that the basic body consists of at least one flat metallic insert and a plastic structure that forms the rest of the contour, which is formed by at least partial injection molding around the metallic insert. For a better connecting action between the metal and the plastic, perforations are provided in the metallic insert. Furthermore, the metallic insert can be completely surrounded by plastic.

This positive connection strut enables a weight reduction compared with purely metallic positive connection struts and also ensures that damaging the plastic body does not lead to a total loss of functionality. The metallic insert also serves to reinforce the structure in relation to service life and buckling load. Yet, the metallic insert accounts for a considerable fraction of the total weight of the positive connection strut.

SUMMARY OF THE INVENTION

Starting from there the purpose of the present invention is to enable the weight of a chassis component as discussed below.

That objective is achieved according to the invention by a chassis Component as described below.

The chassis component according to the invention, in particular one for a motor vehicle, comprises at least two connection points and a structural component that extends between the connection points and connects them rigidly to one another, the component comprises at least one insert made of a ductile material (ductile insert) and at least two connection zones that support or form the connection points, each or at least one of which consists of plastic, such that the structural component comprises at least one intermediate section that connects the connection zones rigidly to one another and that contains or is formed by the insert, the section being designed to be more ductile than each or at least one of the connection zones and, in relation to mechanical overloading of the structural component, forming a locally delimited weak-point.

The invention is based on the provision of a "locally delimited weak-point" in the structural component and thus on a different approach from that of DE 101 53 799 A1, according to which the metallic insert serves to "reinforce" the basic body and therefore extends over the full length of the same in all the embodiments shown therein. In particular the chassis component according to the present invention fulfills the requirements for use in the vehicle according to specification even without a metallic reinforcing insert in the connection zone or zones that consist of plastic. The at least one connection zone or zones of the structural component that consist(s) of plastic is/are of such dimensions that the operating forces and torques occurring during normal operation of the vehicle can be transferred without a metallic reinforcing insert. The intermediate section and/or the ductile insert are in particular only deformed when out-of-the-ordinary mechanical loads and/or torques occur (mechanical overloading), which do not yet lead to a destruction of the at least one connection zone or zones that consist of plastic. Thus, compared with the metallic insert according to DE 101 53 799 A1, the ductile insert can be made relatively short or locally delimited. Preferably, the ductile insert only extends over part of the structural component, the length of the ductile insert preferably being shorter or substantially shorter than the overall length of the structural component. In this way the weight of the chassis component can be kept relatively low. The at least one connection zone or zones that consist of plastic is/are preferably free or largely clear of the ductile insert and/or from any other metallic reinforcing insert, so that there is greater freedom in the design of the structural component. In particular, the intermediate section is located between the connection zones. Advantageously, the connection zones form end sections of the structural component. The connection points are preferably connection points at the ends of the chassis component.

Since the plastic used for the at least one connection zone or zones that consist of plastic shows brittle fracture behavior or fracture behavior with no residual deformation, a mechanical overload of the connection zone or zones would result in fracture and thus to a complete failure of the function of the chassis component. The intermediate section is, in particular, designed so that in the event of a mechanical overload of the structural component, the ductile insert deforms before a fracture of the at least one plastic connection zone or zones can take place. Preferably, the intermediate section and/or the insert is/are (mechanically) more yielding than the at least one plastic connection zone or zones.

In particular, the insert is arranged a distance away from the connection points. Preferably, the insert is positioned between the connection points. Preferably, the connection zones are connected to the intermediate section and/or the insert a distance away from the connection points.

In special cases, for example when structural space is restricted and/or the size of the chassis component is small, it can be advantageous to integrate one or other of the connection zones in the intermediate section so that this connection zone comprises the ductile material or consists of that material. In particular, the intermediate section forms the other connection zone.

Preferably, at least one or both of the connection zones is/are substantially clear of the ductile insert. The connecting section, in which each of the connection zones is combined with the intermediate section and/or the ductile insert, is preferably smaller than the remainder of the respective connection zone, particularly in a direction that passes through the two connection points. Preferably, the connection zones are also free or substantially free from other ductile and/or metallic inserts.

The structural component forms, for example, a strut. In particular the structural component is of elongated shape. In a first variant the structural component is straight or substantially so. In a second variant the structural component is curved.

The insert is in particular straight or substantially so. Preferably, the insert is elongated. Preferably, the structural component and/or the insert extend in a longitudinal direction.

In a further development of the invention the structural component is of triangular, or else Y-shaped or U-shaped form. In this case the chassis component forms a three-point control arm. For example, the chassis component forms a wishbone or a U-shaped control arm. Wishbones are used in particular on the front axle, in the lower plane. Frequent applications for them are McPherson axles. U-shaped control arms are often used in the upper plane, for example in multiple control arm or double transverse control arm axles.

The ductile insert forms, for example, a weak-point in relation to compression loads acting in the longitudinal direction of the structural component. As a supplement or alternative, the ductile insert can form a weak-point in relation to loads acting transversely to the longitudinal direction of the structural component.

Mechanical overloading of the structural component preferably results in plastic deformation of the intermediate section. Furthermore, if the structural component is mechanically overloaded the connection zones are preferably deformed elastically, in particular exclusively elastically. For example, if the structural component is mechanically overloaded the connection zones are deformed exclusively elastically, until the position of the connection points, in particular the position of the connection points relative to one another, has changed due to a plastic deformation of the intermediate section by a predetermined permanent amount which, in accordance with a tried and tested design, is for example at least 10 mm. Advantageously, if the structural component is mechanically overloaded the plastic deformation of the intermediate section takes place earlier than a deformation of the connection zones.

In one design of the invention the plastic deformation of the intermediate section can result in a position change of the connection points relative to one another, of more than 2 mm before a permanent deformation, a crack or a fracture at a point of the structural component outside the intermediate section occurs. If the chassis component has more than two connection points, the aforesaid position change preferably takes place at least between two of the connection points before a permanent deformation, a crack or a fracture occurs at a point of the structural component that lies outside the intermediate section. If the chassis component has a plurality of intermediate sections, the sum of the plastic deformations of the intermediate sections at least in one direction can result in a position change of the connection points relative to one another, for example of more than 2 mm, before a permanent deformation, crack or fracture occurs at a point of the structural component lying outside the intermediate sections.

The ductile insert forms in particular a separate component, which is optimally adapted to its function as a weak-point. Thus, it is possible for the ductile insert to withstand plastic deformations and/or strains of more than 5%. Strains of more than 10% or more than 50% are even possible for the ductile insert before it breaks. Thus, after a mechanical overload of the structural component the chassis component remains functional to a limited extent. Moreover, owing to its severe deformation the chassis component changes the driving behavior of the vehicle to a perceptible extent so that the driver can be made aware that the chassis component has been damaged.

In a design of the invention, at least at one of its ends the insert is imbedded by injection molding in the plastic of the at least one connection zone that consists of plastic. Preferably, however, at least in its end areas the insert is injection molded into the plastic of the connection zones that consist of plastic. In particular, the ends are axial ends of the insert. If the insert is partially free, then it is preferably provided with corrosion protection. Furthermore, the insert can be completely imbedded in the plastic. In that case the intermediate section together with the at least one connection zone or the zones that consist of plastic form a uniform plastic body in which the ductile insert is imbedded in the intermediate section. The plastic can then serve to protect the ductile insert against corrosion, so that no additional corrosion protection is needed.

In a design of the invention the ductile insert is connected in an interlocking manner with the connection zones or with at least one of them which, for example, is formed by the at least one connection zone consisting of plastic. For example, the ductile insert and/or the connection zones or at least one of them have geometries that form an undercut, so that the interlock is produced by one or more undercuts. In particular, in the ductile insert one or more through-holes are provided, through which the plastic material of the at least one connection zone or zones consisting of plastic penetrates.

In the case of an interlocking connection of the ductile insert with the connection zone, it is advantageous for the weak-points to be outside the interlocking connection area, so that a deformation of the ductile insert has no, or only a slight negative effect on the durability of the interlocking connection. Preferably therefore, the weak-point is not located in the interlock area.

The circumferential contour of the ductile insert can be circular. Preferably however, the circumferential contour of the ductile insert deviates from a circular shape. In that way, due to the geometry of the insert alone the connection zones can be connected to one another with interlock in a rotationally fixed manner. For example the ductile insert can be formed by a closed or open hollow profile. Preferably, the ductile insert is formed by a U-section, which can be obtained particularly inexpensively.

The ductile insert can be formed in one piece. In a further development of the invention the ductile insert is formed with more than one part. As components of the insert, for example simple stamped parts can be used, which can be obtained particularly inexpensively. Furthermore, in that case an injected plastic can serve as a spacer between the parts of the ductile insert, for example in order to increase the buckling load.

The ductile insert preferably consists of metal. In particular the ductile insert consists of steel or aluminum. Many metals are entirely suitable for the ductile insert.

The plastic of which the at least one connection zone or zones that consist(s) of plastic is/are made, is preferably filled with fibers. The fibers serve in particular to reinforce the plastic and can therefore also be termed reinforcing fibers. For example, the plastic is filled with endless fibers. As the fibers, for example glass fibers and/or carbon fibers can be used. In particular, the plastic is a thermoplastic or a thermosetting plastic. Advantageously, the plastic is a polyamide or an epoxide resin.

The at least one connection zone or zones consisting of plastic are made in particular by the injection molding process. Preferably, during the production of the at least one connection zone or zones consisting of plastic, the plastic material is injected around the ductile insert. Each of the connection zones can be made separately. However, it is preferable for the connection zones to be produced in a combined injection molding process.

The connection points are in particular provided at the ends of the connection zones that face away from the ductile insert.

Preferably, each of the connection points is formed integrally with its respective connection zone. In this way each of the connection points can be made together with its respective connection zone. In particular, the connection points together with the connection zones can be produced by an injection molding process. However, the connection points can also be made separately and subsequently joined to the connection zones.

In a design of the invention, in at least one or in each of the connection points a perforation is provided, which in particular is circular and preferably through-going. For example, at least one or each of the connection points can be in the form of a ring, a hollow cylinder or a pot. In particular, each of the connection points is in the form of a ring or cylinder. Preferably, a joint is held or formed by at least one, or by each of the connection points, which is for example in the form of a ball joint or a rubber mounting. In particular, each or at least one of the connection points forms a joint holder.

The chassis component is preferably connected at one or more of its connection points to one or more other chassis components, in particular with interposition of the, or of the respective, associated joint(s). Advantageously, the chassis component is connected at one or more other connection points, in particular with interposition of the, or of the respective associated joints, to a vehicle body structure of the motor vehicle.

In a further development of the invention a detection device is provided, by means of which a mechanical overload of the structural component can be detected. The detection device preferably comprises one or at least one electric conductor which, for example, is positioned along the ductile insert. The electric conductor is advantageously embedded in the plastic and is thus protected against impacts by stones and other environmental influences. Furthermore, the electric conductor is connected to an evaluation device of the detection device. If the ductile insert is deformed due to a mechanical overload, the electric conductor breaks or is deformed, and this can be detected by the evaluation device. A detected mechanical overload of the structural component is signaled by the detection device, preferably to one or more other devices and/or to the driver.

As a supplement or alternative, the detection device can detect a mechanical overload of the structural component by a change, attributable to deformation of the ductile insert, of the electrical properties of the ductile insert itself, particularly when the insert consists of a metal. Thus, by means of the detection device preferably at least one electrical property of the insert can be detected, which changes when the insert is deformed. In particular the detection device is electrically connected to the insert.

As a supplement or alternatively, the fibers embedded in the plastic can be used to detect a mechanical overload of the structural component, for example by making use of the optical properties of the fibers (for example in the case of glass fibers) and/or the electrical properties of the fibers (for example in the case of carbon fibers). The detection device preferably comprises fibers embedded in the plastic, whose optical and/or electrical properties are changed by mechanical loading, in particular by a mechanical overload of the structural component. The fibers used for detecting a mechanical overload of the structural component are preferably endless fibers.

If the ductile insert is made of more than one part, its parts are advantageously electrically insulated from one another. Preferably, the parts of the ductile insert are made electrically conducting. In particular, the parts of the ductile insert are connected electrically to the detection device. For example, a mechanical overload of the structural component can be detected by measuring the electric capacitance between the parts of the ductile insert. Due to a deformation of the ductile insert the distance between the parts changes and so too therefore does the capacitance change, which can preferably be detected by the detection device which, in such a case, comprises in particular a capacitance measuring device. Furthermore a mechanical overload of the structural component can be detected by monitoring the parts of the insert for electrical contact. Due to a deformation of the ductile insert its parts can come into electrical contact with one another, and this can preferably be detected by the detection device which, in such a case, contains in particular a current-measuring or resistance-measuring device.

In a further development of the invention the structural component comprises two, at least two or more than two ductile material inserts, which form weak-points in relation to mechanical overload of the structural component in different loading directions. This further development is advantageously implemented in the case of structural components having a triangular, Y-shaped or U-shaped design. The different loading directions are for example the longitudinal direction and the transverse direction of the vehicle.

The number of connection zones is preferably equal to the number of connection points. Furthermore, the number of intermediate sections is preferably smaller than the number of connection points or equal to it less one. The number of ductile inserts too is preferably smaller than the number of connection points or equal to it less one, bearing in mind that each of the ductile inserts can be made in one or more than one part.

In a design of the invention the chassis component according to the invention comprises at least three connection points, so that the structural component comprises at least two inserts of ductile material (ductile inserts) and at least three connection zones that support or form the connection points, of which some, all or at least one consists of plastic. Furthermore the structural component comprises at least two intermediate sections, such that the connection zones are connected rigidly to one another in pairs, in each case by one of the intermediate sections. Each of the intermediate sections comprises one, or at least one of the inserts and is more ductile than each, or at least one of the connection zones connected to it, so that in relation to mechanical overload of the structural component each intermediate section constitutes a locally delimited weak-point. In this design the structural component is for example triangular, Y-shaped or U-shaped.

The chassis component is for example a steering track rod or wheel guide rod. In particular the chassis component forms a transverse control arm. In a first alternative the chassis component is in the form of a two-point control arm and has two connection points. In a second alternative the chassis component is in the form of a three-point control arm and has three connection points.

BRIEF DESCRIPTION OF THE DRAWINGS

Below, the invention is described with reference to preferred embodiments illustrated in the drawing, which shows:

FIG. 6a-6i: Sections through the chassis component according to the second embodiment, taken along the section line 6-6 in FIG. 5, wherein nine different variants of the ductile insert are shown.

DETAILED DESCRIPTION OF THE PREFERRED EMBODIMENTS

Figure 1:
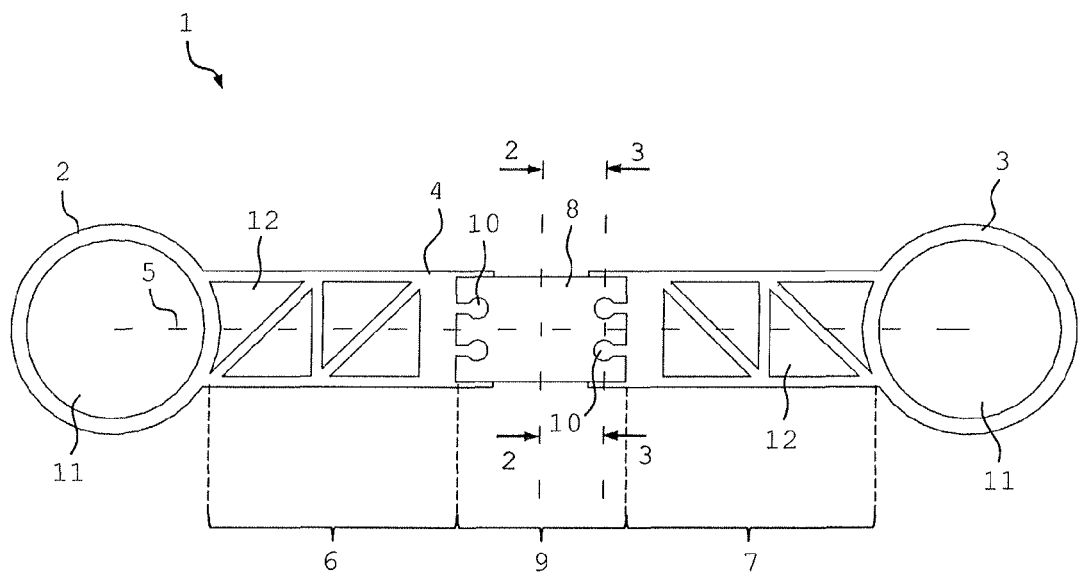
FIG. 1: A very schematic side view of a chassis component according to a first embodiment of the invention.
Figure 2:
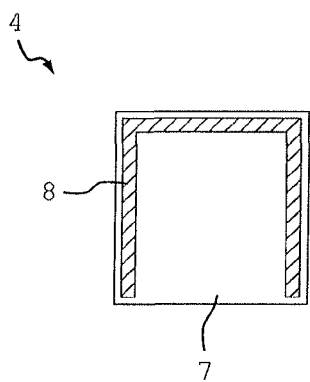
FIG. 2: A section through the chassis component, taken along the section line 2-2 shown in FIG. 1, FIG. 3: A section through the chassis component, taken along the section line 3-3 in FIG. 1, FIG. 4: A schematic plan view of the chassis component according to the first embodiment, with joints inserted.
Figure 3:
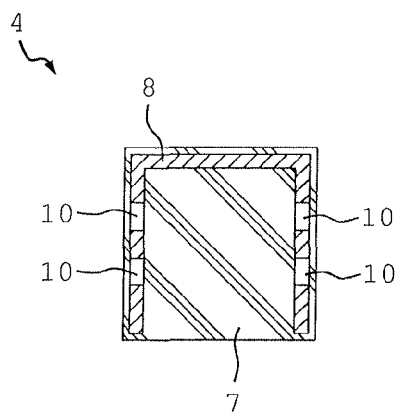

FIGS. 1 to 3 show different views of a chassis component 1 according to a first embodiment of the invention, in which two connection points 2 and 3, each forming a joint holder, are connected rigidly to one another by means of a structural component 4 in the form of a strut. The structural component 4 of elongated form has a central longitudinal axis 5 and the structural component 4 is divided along its central longitudinal axis 5 into three zones. A connection zone 6 of the structural component 4 is formed in one piece with the connection point 2, which latter forms a free end of the connection zone 6. In addition a connection zone 7 of the structural component 4 is formed in one piece with the connection point 3, which latter forms a free end of the connection zone 7. Thus, the connection zones 6 and 7 form end areas of the structural component 4. A distance away from the connection points 2 and 3, the connection zones 6 and 7 are connected rigidly to one another by means of an insert 8, which defines an intermediate section 9 of the structural component 4.

The insert 8 is formed by a U-profile and provided at each axial end with respective through-holes 10. Moreover, the insert 8 consists of a ductile material, in particular a metal. The connection zones 6 and 7 consist of plastic and the axial ends of the insert 8 have the plastic of the connection zones 6 and 7 injection molded around them, so that the plastic extends through the through-holes 10. Thus, by means of the insert 8 the connection zones 6 and 7 are connected with one another in an interlocked manner, in relation both to displacement in the direction of the central longitudinal axis 5 and also to rotation about that axis.

The connection point 2 consists of the same plastic as the connection zone 6 and is made together with it by an injection molding process during which, at the same time, the plastic of the connection zone 6 is injection molded around the insert 8. Moreover, the connection point 3 consists of the same plastic as the connection zone 7 and is made together with it by an injection molding process during which, at the same time, the plastic of the connection zone 7 is injection molded around the insert 8.

Each connection point 2, 3 has a recess 11 which forms a through-going hole of circular shape. Into each of these recesses 11 is inserted a joint, for example in the form of a ball joint or a rubber mounting, after which the chassis component 1 is fitted into the vehicle by means of the joints. In addition recesses 12 are formed in the connection zones 6 and 7, which serve to reduce the weight.

Figure 4:
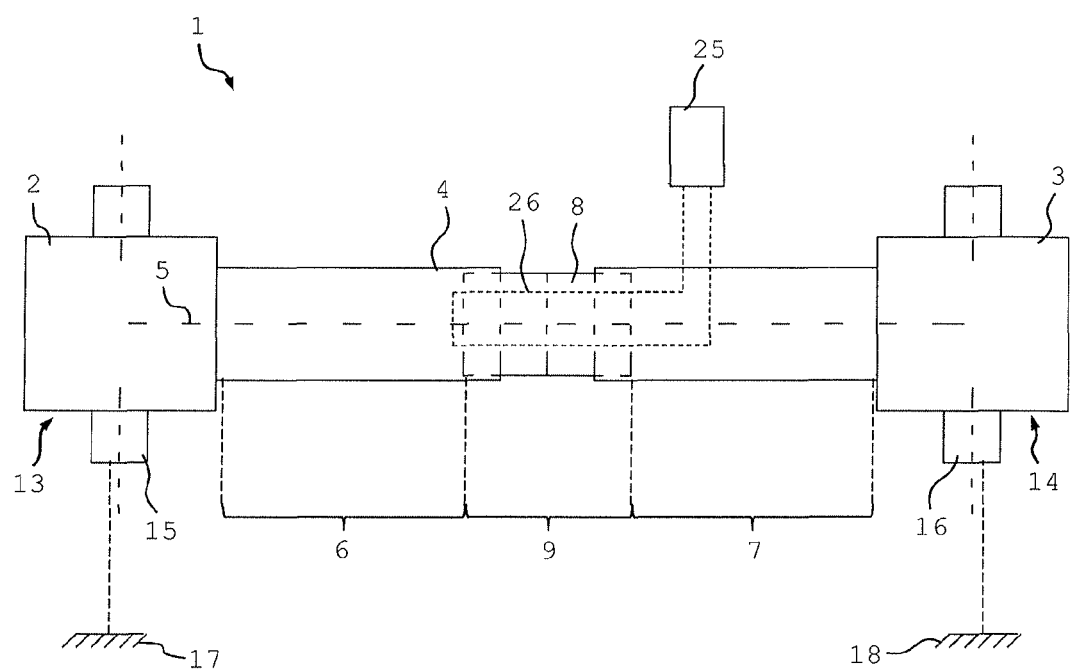

FIG. 4 shows a schematic plan view of the chassis component 1 with joints 13 and 14 inserted, these in this case being in the form of rubber mountings. The inner parts 15 and 16 of the joints 13 and 14 are fixed onto schematically indicated vehicle components 17 and 18, such that the vehicle component 17 is for example a wheel carrier and the vehicle component 18 is for example part of the vehicle body or an auxiliary frame.

Schematically, FIG. 4 also shows a detection device 25, which comprises an electrical conductor 26 that extends along the insert 8 in the form of a closed conductor loop and is fixed within the plastic material of the connection zones. If the insert 8 is deformed, the electrical conductor 26 breaks and this can be detected by the detection device 25.

Figure 5:
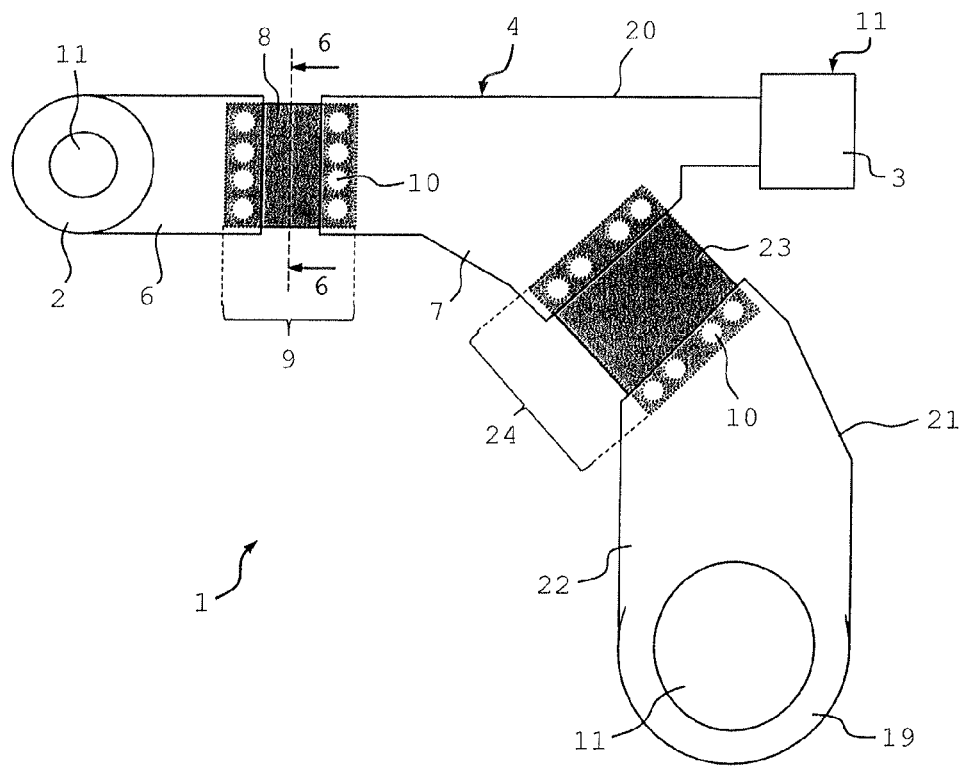
FIG. 5: A schematic plan view of a chassis component according to a second embodiment of the invention.

FIG. 5 shows schematically a plan view of a chassis component 1 according to a second embodiment of the invention; in the figure, features identical or similar to those of the first embodiment are provided with the same indexes as in the first embodiment. The difference from the first embodiment is that the chassis component 1 is in the form of a three-point control arm and has three connection points 2, 3 and 19, which are located at the corners of a triangle and which form in each case a joint holder. The connection points 2, 3 and 19 are connected rigidly to one another by means of a structural component 4 which has two limbs 20 and 21 that extend obliquely relative to one another and is divided into five zones. A connection zone 6 of the structural component 4 is formed integrally with the connection point 2, which latter forms a free end of the connection zone 6. Furthermore, a connection zone 7 of the structural component 4 is formed integrally with the connection point 3, which forms a free end of the connection zone 7. In addition a connection zone 22 of the structural component 4 is formed integrally with the connection point 19, which forms a free end of the connection zone 22. Thus, the connection zones 6, 7 and 22 form end areas of the structural component 4. A distance away from the connection points 2 and 3, the connection zones 6 and 7 are connected rigidly to one another by means of an insert 8, which defines an intermediate section 9 of the structural component 4. Furthermore, a distance away from the connection points 3 and 19, the connection zones 7 and 22 are connected rigidly to one another by means of an insert 23, which defines an intermediate section 24 of the structural component 4.

The limb 20 comprises the connection zones 6 and 7 and also the intermediate section 9, while the limb 21 comprises the connection zones 7 and 22 and also the intermediate section 24. Since the inserts 8 and 23, as also the limbs 20 and 21, extend obliquely relative to one another, the intermediate sections 9 and 24 are orientated for loads acting from different directions.

The insert 8 is formed by one of the profiles shown in FIGS. 6a-6i and is provided at its ends in each case with through-going holes 10. Moreover, the insert 8 consists of a ductile material, in particular a metal. The connection zones 6 and 7 consist of plastic and the ends of the insert 8 have the plastic material of the connection zones 6 and 7 injection molded around them, so that the plastic extends through the through-going holes 10. Thus, the connection zones 6 and 7 are connected to one another in an interlocked manner by means of the inert 8.

The insert 23 is also formed by one of the profiles shown in FIGS. 6a-6i and is provided at its ends in each case with through-going holes 10. Moreover, the insert 23 consists of a ductile material, in particular a metal. The connection zones 7 and 22 consist of plastic and the ends of the insert 23 have the plastic material of the connection zones 7 and 22 injection molded around them, so that the plastic extends through the through-going holes 10. Thus, the connection zones 7 and 22 are connected to one another in an interlocked manner by means of the inert 23.

The connection point 2 consists of the same plastic as the connection zone 6 and is made together with it by an injection molding process during which, at the same time, the plastic of the connection zone 6 is injection molded around the insert 8. Moreover, the connection point 3 consists of the same plastic as the connection zone 7 and is made together with it by an injection molding process during which, at the same time, the plastic of the connection zone 7 is injection molded around the inserts 8 and 23. In addition, the connection point 19 consists of the same plastic as the connection zone 22 and is made together with it by an injection molding process during which, at the same time, the plastic of the connection zone 22 is injection molded around the insert 23.

Each connection point 2, 3, 19 has a recess 11 in the form of a through-going hole of circular shape. Into each of these recesses 11 is inserted a joint, for example in the form of a ball joint or a rubber mounting, after which the chassis component 1 is fitted into the vehicle by means of the joints. In the second embodiment the recess 11 of the connection point 3 extends transversely to the recess 11 of the connection points 2 and 19.

FIGS. 6a-6i shows sections through the insert 8 taken along the section line 6-6 in FIG. 5, wherein nine different variants are shown for the ductile insert 8. Any of these variants can be chosen for the inserts 8 and 23. It is also possible to choose different variants for the inserts 8 and 23.

Variant of FIG. 6a shows a two-part design of the insert 8, whose parts are in each case connected by electric conductors 26 and 27 to a detection device 25. If the insert 8 is deformed the distance between the two parts changes, which results in a change of the electrical capacitance of the condenser formed by the two parts which is indicated schematically by a symbolic condenser symbol C. The capacitance change can be measured by the detection device 25, which can accordingly detect deformation of the insert 8.

Variant of FIG. 6g also shows a two-part design of the insert 8, whose parts are each connected by respective electric conductors 26 and 27 to a detection device 25. If the insert 8 is deformed, the distance between the two parts changes so that they can come into electrical contact with one another; this can be measured by the detection device 25, which can therefore detect deformation of the insert 8.

Obviously, it is also possible to monitor a deformation of the insert 23 by means of the detection device or another detection device.

Figure 7:
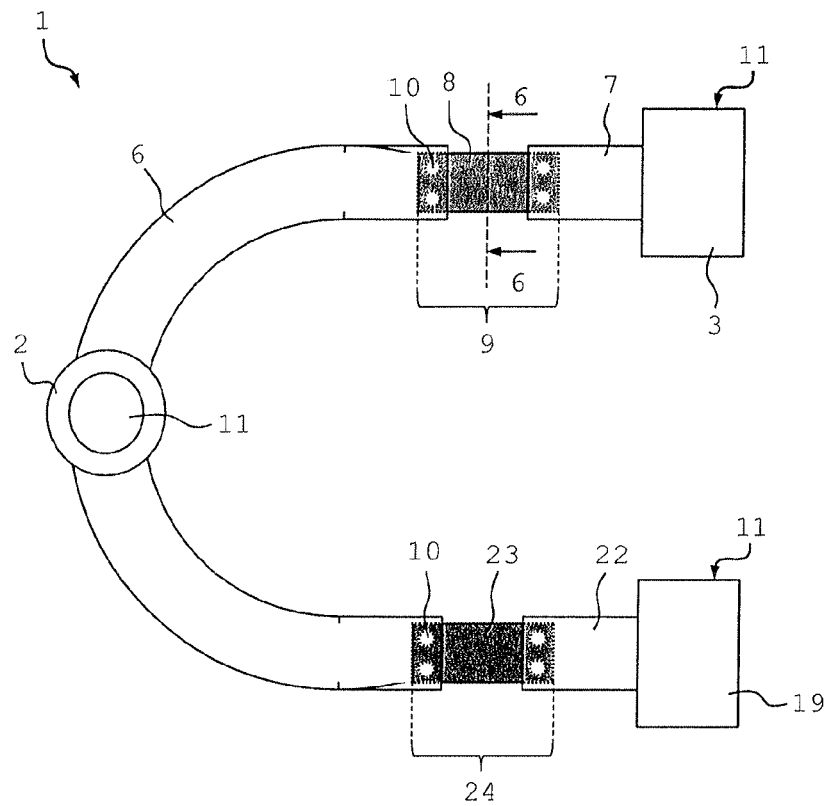
FIG. 7: A schematic plan view of a chassis component according to a third embodiment of the invention.

FIG. 7 shows a schematic plan view of a chassis component 1 according to the third embodiment of the invention; in the figure, features identical or similar to those of the previous embodiments are provided with the same indexes as for the previous embodiments. The third embodiment is a three-point control arm and is designed similarly to the second embodiment. However, the difference from the second embodiment is that the structural component 4 is U-shaped, so that the inserts 8 and 23 extend parallel to one another. Moreover, in the third embodiment the recesses 11 of the connection points 3 and 19 extend transversely to the recess 11 of the connection point 2. For the further description of the third embodiment reference should be made to the description of the second embodiment.

INDEXES

1 Chassis component
2 Connection point
3 Connection point
4 Structural component
5 Longitudinal central axis of the structural component
6 Connection zone of the structural component
7 Connection zone of the structural component
8 Ductile insert
9 Intermediate section of the structural component
10 Through-going hole in the insert
11 Recess in the connection point
12 Recess in the connection zone
13 Joint
14 Joint
15 Inner part of joint
16 Inner part of joint
17 Vehicle component
18 Vehicle component
19 Connection point
20 Limb of the structural component
21 Limb of the structural component
22 Connection zone of the structural component
23 Ductile insert
24 Intermediate section of the structural component
25 Detection device
26 Electrical lead
27 Electrical lead

The invention claimed is:

1. A vehicle component comprising:
at least two connection points (2, 3);
a structural component (4) that extends from one of the two connection, points (2, 3) to the other of the two connection points and connects the two connection points rigidly to one another, the structural component comprising at least one insert (8) made of a ductile material and at least two connection zones (6, 7) that are integral with the two connection points (2, 3), and at least one of the two connection zones comprising plastic, and
the structural component (4) comprising at least one intermediate section (9) connecting the two connection zones (6, 7), the insert (8) defines the intermediate section such that the at least two connection zones are spaced from each other by the intermediate section, a length of the intermediate section, which spans from one of the two connection zones to another of the two connection zones, being shorter than a length of the at least one of the two connection zones comprising plastic, the intermediate section having a greater ductility than a ductility of at least one of the two connection zones (6, 7) such that, in relation to a mechanical overload of the structural component (4), the intermediate section forms a weak-point in the structural component so that when the structural component (4) is subjected to one of a force or a torque resulting in mechanical overloading of the structural component (4), at least the insert (8) inelastically deforms prior to failure of the structural component (4).

2. The vehicle component according to claim 1, wherein a mechanical overload of the structural component (4) results in plastic deformation of the intermediate section (9), and the two connection zones each comprise recesses that extend along a majority of a length thereof between the intermediate section and the respective connection point.

3. The vehicle component according to claim 1, wherein in an event of a mechanical overload of the structural component (4), at least one of the two connection zones (6, 7) deforms elastically.

4. The vehicle component according to claim 1, wherein in an event of a mechanical overload of the structural component (4), at least one of the two connection zones (6, 7) is exclusively elastically deformed until, owing to plastic deformation of the intermediate section (9), a position of the two connection points (2, 3) relative to one another permanently changes by a predetermined amount.

5. The vehicle component according to claim 1, wherein the insert (8) has at least one through-going hole (10) through which the plastic of the at least one of the two connection zones (6, 7) that comprises plastic penetrates.

6. The vehicle component according to claim 1, wherein the intermediate section (9) is designed to be mechanically more yielding than the two connection zones (6, 7).

7. The vehicle component according to claim 1, wherein in an event of a mechanical overload of the structural component (4), plastic deformation of the intermediate section (9) occurs earlier than plastic deformation of the two connection zones (6, 7).

8. The vehicle component according to claim 1, wherein the insert (8) is arranged between the two connection points (2, 3) and spaced away from the two connection points.

9. The vehicle component according to claim 1, wherein the insert (8) is formed by a wall having a U-shaped profile with two ends which, when viewed in cross section, are spaced apart from each other and parallel with respect to each other such that the insert has an open cross sectional profile.

10. The vehicle component according to claim 1, wherein the insert (8) comprises metal, and each of the first and the second connection zones comprises recesses that pass laterally throught the first and the second connection zones.

11. The vehicle component according to claim 1, wherein the plastic is filled with reinforcing fibers.

12. The vehicle component according to claim 1, wherein the plastic is either thermoplastic or a thermosetting plastic.

13. The vehicle component according to claim 1, wherein the two connection points (2, 3) form free ends of the two connection zones (6, 7).

14. The vehicle component according to claim 1, wherein the two connection points (2, 3) are made of a material that is the same as that of the two connection zones (6, 7).

15. The vehicle component according to claim 1, wherein each of the two connection points (2, 3) is shaped as either a ring or a cylinder.

16. The vehicle component according to claim 1, wherein each of the two connection points (2, 3) receives an inner part of a joint (13, 14) such that the inner parts of the joints pass completely through the two connecting points.

17. The vehicle component according to claim 1, wherein the insert (8) is formed of more than one part.

18. The vehicle component according to claim 1, wherein the structural component (4) comprises at least two inserts (8, 23) made of a ductile material which, in relation to a mechanical overload of the structural component (4), form weak-points in different loading directions.

19. A vehicle component comprising:
a structural component that defines a longitudinal axis, the structural component comprising an insert and first and second connection zones, the insert axially defines an intermediate section, the first connection zone has a remote end and an inner end that is defined by a first end of the intermediate section, and the second connection zone has a remote end and an inner end that is defined by a second end of the intermediate section, the first and the second ends of intermediate section are rigidly connected to the to the first and the second connection zones, respectively;
a first connection point is rigidly connected to the remote end of the first connection zone and a second connection point is rigidly connected to the remote end of the second connection zone such that the structural component rigidly couples the first and the second connection points to one another;
the insert is formed of a ductile material that axially spans from the first connection zone to the second connection zone, and at least one of the first and the second connection zones comprises plastic, an entirety of an axial length of the insert along the longitudinal axis is shorter that an axial length of the first connection zone and an axial length of the second connection zone;
the intermediate section having a greater ductility than a ductility of the at least one of the first and the second connection zones such that the insert forms a weak-point in the structural component so that when the structural component is subjected to one of a force or a torque resulting in mechanical overloading of the structural component, at least the insert inelastically deforms prior to failure of the structural component; and
at least one of the first and the second ends of the insert is surrounded by plastic that extends from the inner end of the at least one of the first and the second connection zones that comprise plastic.

20. The vehicle component according to claim 19, wherein the intermediate section forms another connection zone.

21. The vehicle component according to claim 19, wherein the insert (8) is connected to the first and the second connection zones (6, 7) in an interlocked manner.

22. The vehicle component according to claim 21, wherein the interlock is produced by one or more undercuts.

23. The vehicle component according to claim 21, wherein the weak-point is located in an area spaced from the interlock.

24. A vehicle component comprising:
a structural component defining a longitudinal axis and comprising an insert and first and second connection zones, the first connection zone has a remote end and an inner end that is rigidly connected to a first end of the insert, and the second connection zone has a remote end and an inner end that is rigidly connected to a second end of the insert, a longitudinal axial length of the first connection zone from the remote end to the inner end thereof and a longitudinal axial length of the second connection zone from the remote end to the inner end thereof are each greater than a longitudinal axial length of the insert from the first end to the second end thereof;
a first connection point is rigidly connected to the remote end of the first connection zone and a second connection point is rigidly connected to the remote end of the second connection zone such that the structural component rigidly couples the first and the second connection points to one another;
the insert is formed of a ductile material and defines an intermediate section of the structural component, and at least one of the first and the second connection zones comprises plastic, the first end of the inserts received within plastic that extends from the first connection zone and the second end of the insert is received within plastic that extends from the second connection zone;
the intermediate section having a greater ductility than the at least one of the first and the second connection zones such that the insert forms a weak-point in the structural component so that when the structural component is subjected to one of a force or a torque resulting in mechanical overloading of the structural component, at least the insert inelastically deforms prior to failure of the structural component; and
the vehicle component comprises a detection device (25) by which mechanical overload of the structural component (4) is detectable.

25. The vehicle component according to claim 24, wherein the detection device (25) comprises at least one electrical conductor (26), which extends along the ductile insert (8).

26. The vehicle component according to claims 24, wherein the electrical conductor (26) is embedded in the plastic.

27. The vehicle component according to claim 24, wherein the detection device (25) comprises fibers embedded in the plastic, the fibers have either optical or electrical properties that change in the event of a mechanical overload of the structural component (4).

28. The vehicle component according to clam 27, wherein the fibers are either glass fibers or carbon fibers.

29. The vehicle component according to claim 24, wherein the detection device (25) detects at least one electrical property of the insert (8) which changes when the insert (8) is deformed.

30. The vehicle component according to claim 29, wherein the insert is a multi-component insert comprising at least two parts, and the detection device (25) either detects an electrical capacitance between the parts of the multi-component insert (8) or monitors of the multi-component insert (8) to detect electrical contact between the parts of the multi-component insert.

\* \* \* \* \*